United States Patent Office 3,505,076
Patented Apr. 7, 1970

3,505,076
EDIBLE FOOD PRODUCT AND PROCESS
John F. Maloney, Eugene H. Sander, and Adolf Wilhelm, Minneapolis, Minn., assignors to General Mills, Inc., a corporation of Delaware
No Drawing. Filed Mar. 10, 1967, Ser. No. 622,095
Int. Cl. A23l 1/18
U.S. Cl. 99—81           23 Claims

ABSTRACT OF THE DISCLOSURE

A new food product and process for making the same which comprises impregnating a puffed cereal matrix selected from the group consisting of puffed cereal doughs and grains with a slurry comprised of fat and starch.

---

The present invention relates to an edible food product and the process for preparing same. More particularly, it relates to the process of impregnating a puffed cereal matrix selected from the group consisting of puffed cereal doughs and puffed grains with a starch-fat slurry and to the resultant product. In an especially preferred aspect, the invention relates to the production of such a product which is similar to a nut in taste, texture and appearance.

Nuts are expensive and are difficult to obtain in some instances Also they are subject to seasonal variation in price and availability However, nuts have achieved wide popularity as a snack and as an ingredient in other food products such as bakery goods and casseroles Much research has been done in the past toward production of a simulated nut product However, to the best of our knowledge there is no manmade product currently available which is similar to a nut in taste, texture and appearance and which will function both as a snack and as a nut-like food ingredient in hot, moist food systems such as cakes, cookies and casserole dishes It is, accordingly, an object of our invention to produce a novel edible food product.

It is another object of our invention to produce a product which is similar to a nut in taste, texture and appearance.

It is also an object of our invention to produce a product which will retain to a large degree its taste, texture and appearance when processed with other food ingredients under hot, moist conditions.

It is a further object of this invention to produce a product similar to a nut in taste, texture and appearance from materials which are relatively inexpensive and not subject to seasonal variation in supply as are nuts.

It is a still further object of this invention to provide a process for the production of a new snack type product made from a puffed cereal matrix selected from the group consisting of puffed cereal doughs and cereal grains.

These and other objects will become apparent as we further describe our invention.

We have found that we can produce a snack product with a new texture by impregnating a cereal grain matrix chosen from the group consisting of puffed cereal grains and puffed cereal doughs with a slurry comprised of fat and starch. We have also found that we can produce products in accordance with the present invention that are highly similar to various nuts, or pieces of nuts, in taste, texture and appearance by selecting certain puffed cereal grains or puffed cereal doughs, shaping same where desired, and adding flavoring and/or coloring agents to the grains, preferably by including such agents in the starch-fat slurry.

The products of the present invention can be prepared from a wide variety of puffed cereal grains or puffed cereal doughs. Representative puffed cereal grains are puffed whole wheat, puffed rice, puffed yellow corn and the like. The cereal doughs may be prepared from wheat, corn, oats, barley, rye, rice and the like and may be derived from mixtures thereof or from single grains. The doughs are prepared from the grain meals or flours by conventional means such as by the process disclosed in Collatz Patent 2,162,376, this patent being illustrative of a facile manner in which the cooking of the dough material may be effected. Starch may be added to the particulate meals or flours prior to the cooking step to improve the puffability of the resulting dough pellets. Of course, various other known ingredients can also be added such as salts and other flavoring agents, coloring agents and the like.

The described cereal grains or doughs are puffed from about 2 to about 6 times their original size although the preferred range is about 3 to about 5 times the original size. The cereal grains or cereal dough pellets can be puffed by a variety of known methods including the use of radiant heat, gun puffing and the like. Preferably, the grains or dough pellets are gun puffed using a gun puffing apparatus of any suitable type such as a batch gun puffer of the barrel type. The grains or dough pellets can be expanded into a vacuum or into atmospheric pressure. Thus, they are puffed by sudden release from a confined area into an area having a larger volume and lower pressure. One method of puffing the grains or dough pellets is to place same in the puffing gun which is heated to the designated temperature, allow the steam pressure to develop by driving moisture from the grains or pellets and then suddenly release the grains or pellets to the atmosphere. Internally developed steam pressures which are particularly useful are 50 to 150 p.s.i. The temperatures in such batch puffing apparatus will vary more or less with the pressure obtained. Temperatures of 350 to 725° F. give good results. The optimum pressure and temperature varies somewhat depending on the particular grain or dough pellet being puffed.

An especially preferred method of puffing the cereal grains or cereal dough pellets involves the addition of steam to the puffing gun chamber. One such method of puffing using added steam is that disclosed and claimed in Takuzo Tsuchiya et al. Patent 3,231,387 which disclosure is incorporated herein by reference. In brief, said process involves continuously feeding the grains or pellets into a pressurized processing zone into which at least one gaseous processing fluid is introduced at a location providing immediate contact with the grains or pellets which enter the zone, maintaining the processing fluid in a turbulent condition at the location of initial contact to increase its effective initial action on the grains or pellets, and puffing the grains or pellets by continuously discharging both the fluid and grains or pellets in to a region of substantially lower pressure than the pressure within the processing zone. Superheated steam is the preferred fluid for use in the process since it especially promotes the more rapid initial transfer of heat from the fluid to the colder grains or pellets entering the processing zone.

In the preferred gun puffing procedures, the grains or dough pellets preferably have a moisture content in the range of about 8 to 16% by weight prior to being puffed. It is to be understood, however, that the moisture level will vary somewhat with the particular puffing procedure used, the particular grain or dough pellet being puffed and the amount of expansion desired.

As indicated above, the described puffed cereal matrix is impregnated in accordance with our invention with a slurry comprising starch and fat. The starch is present in the slurry in an amount sufficient to substantially coat the surface of the puffed cereal matrix when the same is impregnated with the slurry. In addition to substantially coating the surface, the starch helps to fill the pores of the expanded cereal matrix. The amount of starch on the surface and in the pores of the final product will depend somewhat on the amount of expansion of the grain, the conditions of processing and the amount of starch present in the slurry. In general we prefer a level of about 5% to about 50% of starch by weight of the slurry. When less than about 5% is added, the texture of the final product is not as satisfactory as when starch is added at a level greater than 5%. A slurry containing more than about 50% starch becomes extremely viscous with the result that impregnation becomes difficult. We particularly prefer a range of about 20% to about 40% of starch by weight of the slurry. When this level is used we find that a product with outstanding texture and stability results.

We prefer the level of added starch in the final product to be between about 2.5 to about 20%. It is uneconomical to use more than about 20% of starch because there is little added benefit from starch present above this level, although obviously more starch could be used. If starch is present at a level below about 2.5% by weight of the final product, the resultant texture is not as satisfactory.

Any of a wide variety of starches can be used in the slurry. Examples of starches which may be used are waxy maize, corn, wheat, tapioca and the like. Mixtures of various starches can be used as well as farinaceous materials having a high starch content such as wheat flour, corn flour and the like. Although any starch may be used, we particularly prefer a starch which has been pregelatinized. Pregelatinized starch is made by heating a starch-water slurry to a temperature at or slightly above the gelationization point of the starch. One of the methods for pregelatinizing is to place a thin film of the slurry over a heated roll. This gelatinizes and dries the product. The starch is then scraped off the heated roll by a stationary knife and pulverized. Pregelatinized starch provides superior texture and water absorbing qualities.

The fat should be one that will be in a solid state at normal storage temperatures. Fats which are liquid at these temperatures have a tendency to seep out of the puffed grain matrix even with the presence of added starch. Fats which are liquid at normal storage temperatures also give an oily taste when eaten and an oily feel when the product is being held in one's hand. Fats which are solid at very high temperatures are more stable at room temperatures and give different textural sensations, best described as flaky, upon eating. This flaky "mouth feel" may be objectionable when certain flavors are present. In general we prefer to use a fat with a melting point range above about 70° F. and below about 150° F. We especially prefer a fat with a melting point range between about 90° F. and about 135° F. The fat we most prefer by itself, or as part of a mixture of fats is saturated coconut oil with a melting point range between 105° and 110° F. We prefer saturated coconut oil because of its melting point range, its benefits to the final texture of the product, and its "mouth feel" upon eating. When stability is crucial, higher melting point range fats may be preferred. When texture and "mouth feel" are important and stability is not as important, such as when the product is eaten as a snack, lower melting point range fats may be used.

The fat uptake by the grain matrix depends on a number of variables. The most obvious is the amount of fat in the slurry. Other variables which affect the amount of fat uptake are whether the process is carried out under atmospheric, increased or reduced pressure and the extent of expansion of the pores of the grain.

In general, the amount of fat pickup amounts to about 20 to about 75%, by weight of the final product. We especially prefer a range of about 40 to about 60%. This preferred range gives the desired textural sensations upon eating.

The starch-fat slurry used in our process is prepared by simply mixing the starch with the liquified fat. Thus the fat can be heated to its melting point or above and the starch can be added with stirring. Of course the starch can be reduced in particle size to give greater stability to the slurry. Generally speaking, mild agitation may be used to prevent separation if the impregnation of the puffed cereal matrix is not carried out in a relatively short period of time. However, agitation may be used in any case to help keep the starch dispersed throughout the fat.

As mentioned previously, appropriate coloring and flavoring materials may be added to our product. Flavoring and coloring materials may be added to simulate a nut or other flavors such as cheese or meat to take advantage of the unique textural and stability characteristics of the product. These additives may be a part of the slurry, added directly to the finished product after impregnation or be brought in contact with the finished product in any way familiar to the art. When such agents are added to the starch-fat slurry and particularly where the same are not completely soluble in the liquefied fat, it is also preferred to include an emulsifier to aid in the formation of a homogeneous soluiton or dispersion. Representative emulsifiers which can be used are lecithin, glycerol monooleate and the like.

The impregnation of the puffed cereal matrix with the starch-fat slurry can be carried out in a variety of ways. It is only necesary that the said matrix is brought into intimate contact with the slurry. Preferably, the puffed cereal bodies are immersed in the starch-fat slurry. Thus the puffed cereal grains or dough pellets can be added to a vessel containing the slurry and then immersed by being forced under the surface of the slurry using a screen or the like to keep the grains or pellets from rising.

The impregnation is preferably carried out at a temperature in the range of about 70° to about 175° F. The temperature must be high enough to keep the fat liquid during processing. We prefer a temperature high enough to prevent solid fat buildup on equipment as processing is completed and the heat source removed. Any temperature above the melting point range of the fat may be used, however, temperatures approaching 200° F. tend to cause the finely divided starch particles to coagulate or lump, making processing somewhat more difficult. Also, temperatures high enough to decompose the fat or starch are to be avoided. Additionally, when flavoring agents are added to the slurry, we prefer to use temperatures nearer the melting point range of the fat used because many flavoring agents are adversely affected at high temperatures, i.e., the more volatile components may be driven off. Of course, when flavoring components such as salt or spices are added to the already impregnated puffed cereal matrix, the processing temperature used during the impregnation would have not such adverse affect.

Although there is some degree of slurry uptake by the puffed cereal grains under atmospheric or increased pressure conditions, we prefer to carry out the impregnation under vacuum. We prefer vacuum treatment because we have found that this type of treatment gives greater absorption of the slurry in the pores of the product and greater absorption of the starch component. When a high degree of moisture resistance is not required and therefore a large amount of starch uptake is not needed, impregnating may be done either under atmospheric pressure or increased pressure.

When the impregnation of the grain is carried out under a vacuum, the preferred range, as measured by a standard vacuum gauge, is about 8 to about 29 inches of Hg. Lower ranges may be used but the beneficial effects of vacuum processing diminish greatly at these levels.

Our particularly preferred range of operation for vacuum treatment is from about 14 to about 20 inches of Hg. We have found that this is the optimum range to give the desired amount of starch uptake. Although we have found that the precentage of starch uptake increases with decreasing pressure below atmospheric pressure and the percentage of the fat also increases, there is a law of diminishing returns in operation in this system. This is because the vacuum acts to withdraw the air from the expanded pores of the cereal matrix and as the amount of air left within the cereal matrix decreases to an extremely low level, the efficiency of the vacum also decreases. A point is reached, therefore, where a lower pressure will remove only a very small amount of air and the slurry uptake would increase only slightly.

If vacuum is not used, processing may take place under atmospheric pressure or increased pressure conditions. The addition of pressure will increase the total fat uptake but does not seem to affect the uptake of starch from the slurry. In other words, the amount of starch absorbed remains relatively constant although the amount of fat absorbed increases with increasing pressure. Pressures of up to 500 p.s.i.g. and higher may be used. For economic reasons, pressures of from about 10 to 250 p.s.i.g. are preferred.

Processing time is not critical and will, of course, be affected by the other variables mentioned—i.e., the extent of expansion of the pores of the grains or dough pellets, the amounts of fat and starch in the slurry and the like. There seems to be a maximum uptake depending upon whether the process is carried out under vacuum, pressure or atmospheric conditions; and once this point is reached an increase in holding time has little or no effect. Preferably, the processing is completed in a relatively short period of time such as from about one minute to less than about one hour.

As is apparent from the above and the examples to follow, the use of a starch-fat slurry is essential to the practice of our invention. The starch substantially coats the surface of the puffed cereal matrix and also helps to fill the pores of the said matrix. While we do not wish to be bound by the following theory, it is believed that the added starch absorbs moisture and prevents the same from penetrating into the interior of the product. Thus when the product is subjected to hot, moist processing conditions, such as those present during the baking of a brownie, the product retains in a large measure its size and textural qualities. Additionally, when the product is subjected to heat, the fat present may liquify. The added starch helps inhibit fat seeping out of the product. In contrast, a puffed cereal matrix impregnated with fat alone, when subjected to the above conditions, will shrink almost to its unpuffed size, assume its original unpuffed shape and become hard. Also, the fat seeps out freely from such cereal matrix.

Obviously the addition of starch is most important when our product is used as a food ingredient in other food products where temperatures are much higher than ambient temperatures and abundant moisture is available. The presence of starch, however, will aid in extending the periods of storage when the product is to be eaten by itself; and will also help to preserve product texture after being exposed to moisture in the air.

In order to further illustrate various features of the present invention, the following examples are included.

EXAMPLE I

A starch-fat slurry was prepared by heating saturated coconut oil to 130° F. and then slowly adding pregelatinized tapioca starch while stirring the hot liquid oil. Flavoring, coloring and emulsifying agents were then added to give a slurry consisting of the following ingredients:

Formula: Percent by weight
Coconut oil, saturated _____ 67.982
Pregelatinized tapioca starch (Redisol 88) __ 30.000
Black walnut, imitation extract _____ 0.500
Magna Nut Flavor (available from Magnus Mabeer Reynard) _____ 0.500
Lecithin _____ 0.500
Glycerol monooleate _____ 0.500
Color—Vegetone extra yellow _____ 0.018

Michigan White Wheat was first cooked and then dried to 14% moisture. The wheat was then fed continuously into a gun puffing apparatus as described in the aforementioned patent of Tsuchiya et al. The feed rate was 10 lbs./minute. The following gun conditions were employed:

Barrel temperature—700° F.
Angle of barrel below horizontal (°)—2
Barrel rotation (r.p.m.)—40
Puffing nozzle orifice (diam.)—½ inch
Barrel size (diam. x length)—10 inch diam. x 12 feet long Superheated steam at a temperature of 380° F. was introduced into the gun at a pressure of 100–120 p.s.i.g. The wheat had an average retention time in the gun of 2 minutes and was continuously ejected to the atmosphere to yield a puffed cereal matrix having a density of 0.294 g./ml. (the starting cooked wheat had a density of 1.110 g./ml.).

The puffed wheat was placed in a glass container containing the slurry with a porous device on top of the wheat to prevent it from floating. The container was then placed in a vacuum oven and a vacuum of 16 inches of Hg was drawn and held to 2 minutes. The temperature was held at 130° F. At the end of 2 minutes the impregnated wheat was removed from the slurry. The impregnated puffed wheat when cooled to room temperature had the appearance and texture of a walnut bit and a delicious walnut-like taste. An analysis of the product yielded the following data:

Percent uptake by weight of final product
Slurry _____ 66.4
Fat _____ 54.5
Starch _____ 11.9

EXAMPLE II

The identical process was repeated but this time under atmospheric conditions for 2 minutes. An analysis of the product yielded the following data:

Percent uptake by weight of final product
Slurry _____ 42.5
Fat _____ 32.3
Starch _____ 10.2

The final product was similar to the product of the first example but the "mouth feel" was not as good because of the lack of penetration of a large amount of the slurry to the interior of the product and a lesser amount of fat and starch absorbed.

EXAMPLE III

Example I was repeated except that ground whole wheat at a level of 40% by weight of the slurry was used as the starch ingredient in the slurry, a vacuum of 20 inches of Hg was drawn for 2 minutes and no coloring, flavoring or emulsifying agents were used.

The final product was similar in shape and texture to the product of Example I. This product is not as moisture resistant as the products of Examples I and II. Upon analysis the final product yielded:

Percent uptake by weight of final product
Slurry _____ 71.0
Fat _____ 52.6
Ground whole wheat_____ 18.4

EXAMPLE IV

Grade A Fancy #1 polished rice having approximately 10% moisture was puffed in the same manner as the wheat of Example I under the following conditions:

Barrel temperature—650° F.
Angle of barrel below horizontal (°)—3
Barrel rotation (r.p.m.)—60
Puffing nozzle orifice (diam.)—15/32 inch
Barrel size (diam. x length)—10 inches x 12 feet The feed rate was 10 lbs./min., the steam temperature was 410° F., the steam pressure was 90 p.s.i.g. and the average retention time in the gun was 2 minutes.

The resulting puffed rice (approximately 8 times original size) was passed through flaking rolls. It was then impregnated as in Example I under a vacuum of 16 inches Hg at 130° F. for 2 minutes with a slurry consisting of:

| | Percent by weight |
|---|---|
| Coconut oil, saturated | 68.995 |
| Pregelatinized tapioca starch (Redisol 88) | 30.000 |
| Almond flavor | 0.500 |
| Glycerol monooleate | 0.500 |
| Color—Vegetone extra yellow | 0.500 |

The final product had the texture and appearance of an almond and a delicious almond-like taste. The uptake of the slurry was:

| | Percent uptake by weight in final product |
|---|---|
| Slurry | 75.7 |
| Fat | 62.3 |
| Starch | 13.5 |

EXAMPLE V

The ingredients and conditions used were identical with Example IV with the exception that Capital City Products Co.'s Hymar, a saturated coconut oil containing saturated cottonseed oil and having a melting point of about 115° F., was used as the liquid fat component. The product was virtually identical with the final product of Example IV. An analysis of the final product yielded the following:

| | Percent uptake by weight of final product |
|---|---|
| Slurry | 75.4 |
| Fat | 62.0 |
| Starch | 13.4 |

EXAMPLE VI

Hominy yellow corn was treated with lime and cooked for 15 minutes at 212° F. After cooking the corn was steeped for 7 hours, dried to 13% moisture and puffed in the same manner as the wheat in Example I under the following conditions:

Barrel temperature—600° F.
Angle of barrel below horizontal (°)—2
Barrel rotation (r.p.m.)—46
Puffing nozzle orifice (diam.)—17/32 inch
Barrel size (diam. x length)—10 inches x 12 feet The feed rate was 15 lbs./min., the steam temperature was 405° F., the steam pressure was 113 p.s.i.g. and the average retention time of the corn in the gun was 2 minutes.

The resulting puffed corn (approximately 4-5 times original size) was impregnated as in Example I with the same ingredients and relative amounts of ingredients and identical processing conditons. The product had the texture and appearance of a walnut and a delcious walnut-like taste, although the texture was slightly harder than the wheat based product, there was a difference in color and a distant corn taste. Upon analysis the final product yielded:

| | Percent uptake by weight of final product |
|---|---|
| Slurry | 63.3 |
| Fat | 55.3 |
| Starch | 8.0 |

EXAMPLES VII, VIII, IX AND X

These examples were designed to show the effects of various levels of starch in the slurry on the textural characteristics of the finished product. Whole wheat was puffed and impregnated under conditions identical with those of Example I except that the composition of the slurries used varied. The slurries were comprised of:

| | Percent by weight |
|---|---|
| Coconut oil, saturated | 58.232–88.232 |
| Pregelatinized tapioca starch (Redisol 88) | 10–40 |
| Black walnut extract imitation | 0.500 |
| Magna Nut Flavor (available from Magnus Mabeer Reynard) | 0.500 |
| Lecithin | 0.750 |
| Color—Vegetone extra yellow | 0.018 |

| | Coconut oil | Starch |
|---|---|---|
| Example VII | 88.232 | 10 |
| Example VIII | 78.232 | 20 |
| Example IX | 68.232 | 30 |
| Example X | 58.232 | 40 |

As expected, Examples IX and X had more starch in the finished product. All products resembled walnut pieces in texture and all had a delicious walnut-like taste. Examples VIII and IX had superior textural properties, i.e., upon eating they tasted most like a nut. Because of the increased starch level in Example X, the nut-like product was somewhat dry upon eating because the higher starch level had a tendency to absorb the saliva present in the mouth. Example VII did not give a "chewy" sensation as close to a walnut as did the other examples.

Portions (½ cup) of the products of each of Examples VII–X were added to brownie batters prepared from a commercially available brownie mix (Betty Crocker) and the batters were baked. Examination of the baked brownies showed that the products retained their size and eating qualities to a large degree. The product of Example X prepared from the slurry containing 40% starch was best while the product of Example VII prepared from the slurry containing 10% starch showed the most shrinkage. However, such latter product was much superior to a similar one impregnated only with saturated coconut oil which softened, shrunk to almost its original size and hardened as the baked brownie was allowed to stand.

EXAMPLE XI

Wheat puffed as in Example I was impregnated under a pressure of 100 p.s.i.g. for 1.5 minutes in a glass container with a porous screen to stop the grain from floating. The slurry consisted of 60% fat and 40% starch and the temperature of the slurry was held at 150° F. throughout the processing. The starch used was National Starch Co.'s Col-Flo 67, a modified waxy maize starch. The fat used was Durkees Paramount C, a confectioners hard butter with a melting point range of 101–103° F. Upon analysis of the final product it was found to contain:

| | Percent uptake by weight of final product |
|---|---|
| Slurry | 63.8 |
| Fat | 54.8 |
| Starch | 9.0 |

The product was very similar to the product of Example I. However, the texture was not quite as good due to the fact that less starch was absorbed even though the slurry contained 10% more starch. The product had better mouth-feel than the product of Example II due to the fact that more fat was absorbed.

In the above examples, the slurry uptake was determined by subtracting the weight of a given volume of unimpregnated puffed grain from the weight of the same volume of impregnated product and then calculating the percent by dividing the difference by the weight of the impregnated grain. The fat uptake was determined by extracting the fat from the given volume of the impregnated product with ether, weighing the extracted fat and then calculating the percent by dividing such weight by the weight of the impregnated grain. The percent of starch uptake was then determined by subtracting the percent fat uptake from the percent slurry uptake. It is also to be noted that the impregnation under vacuum results in products having a high percent of the starch in the pores of the product. Thus products prepared as in Example VII through X had approximately 1.5, 2.9, 3.6 and 6.1% by weight, respectively, of the starch on the inside and 1.9, 3.8, 8.0 and 11.2% by weight, respectively, of the starch on the surface. Such products had a fat uptake of 57.8, 55.3, 52.7 and 49.2% by weight, respectively.

To determine the amount of starch within the pores of the puffed grain it was necessary to first remove the surface starch. This was done by washing a given volume of the product with a portion of liquified fat of the same type used in the impregnating slurry. The washed product was then weighed and the slurry and fat uptake were determined as previously described. The starch inside the body of the puffed grain was then determined by subtracting the percent fat uptake from the percent slurry uptake. To obstain estimates of surface starch two samples were processed under identical slurry and processing conditions. One sample was used to determine the starch content inside the body of the puffed grain, the other was used to determine total starch content, that is, inside and surface starch. An estimated value for the surface starch was obtained by subtracting the value for the inside starch from the total starch content.

It should be understood that the foregoing is merely illustrative of certain embodiments of the invention and many variations may be made by those skilled in the art without departing from the spirit and scope of the invention.

Now therefore, we claim:

1. An edible food product which is comprised of a puffed cereal matrix selected from the group consisting of cereal grains and cereal doughs which have been puffed from about 2 to about 6 times original size and impregnated with a slurry consisting essentially of liquid fat and starch, with said starch being present at a level adequate to substantially coat the surface of the product, said liquid fat being solid at normal storage temperatures and present at a level of about 20 to about 75% by weight of the finished product.

2. The product of claim 1 where the starch is pregelatinized starch.

3. The product of claim 1 where the puffed cereal matrix is puffed whole wheat.

4. The product of claim 1 where the puffed cereal matrix is puffed rice.

5. The product of claim 1 where the starch is present in an amount of from about 5 to about 50% by weight of the slurry.

6. The product of claim 1 where the starch is present in an amount of about 20 to about 40% by weight of the slurry.

7. The product of claim 1 where the liquid fat has a melting point range of from about 70 to about 150° F.

8. The product of claim 1 where the liquid fat has a melting point range of from about 90 to about 135° F.

9. The product of claim 1 where the liquid fat is saturated coconut oil with a melting point range of 105° to 110 F.

10. The product of claim 1 where the cereal grains and cereal doughs have been puffed from about 3 to about 5 times original size.

11. The product of claim 1 which also comprises at least one additive selected from the group consisting of flavoring and coloring materials.

12. A product with the taste, texture and appearance of a nut which is comprised of a cereal grain puffed from about 3 to about 5 times original size which has been impregnated with a slurry consisting essentially of: first, a liquid saturated coconut oil with a melting point range of 105° to 110° F., and second, pregelatinized tapioca starch present at a level of about 20% to about 40% by weight of the slurry and third, flavoring and coloring materials.

13. The product of claim 12 where the grain is whole wheat and the final product has the taste, texture, and appearance of a walnut.

14. A process for preparing an edible food product which comprises impregnating a puffed cereal matrix selected from a group consisting of cereal grains and cereal doughs which have been puffed from about 2 to about 6 times original size with a starch-fat slurry, said slurry containing enough starch to substantially coat the surface of said matrix, said fat being liquid during processing and solid at normal storage temperatures, and said impregnating being carried out at a temperature high enough to keep said fat liquid.

15. The process of claim 14 where the impregnating is carried out under increased pressure.

16. The process of claim 14 where the impregnating is carried out under vacuum.

17. The process of claim 16 where the vacuum is about 14 to about 20 inches of Hg as measured by a standard vacuum gauge.

18. The process of claim 14 where the starch is present in an amount of from about 5 to about 50% by weight of the slurry.

19. The process of claim 14 where the fat has a melting point range between 70° and 150° F.

20. The process of claim 14 where the puffed cereal matrix is puffed whole wheat.

21. The process of claim 14 where the puffed cereal matrix is whole wheat puffed to from about 3 to about 5 times original size, the starch is pregelatinized tapioca starch and is present in an amount of from about 20 to about 40% by weight of the slurry, the fat has a melting point range of from about 70 to about 150° F. and the impregnation is carried out by immersing the puffed cereal matrix in the slurry.

22. The process of claim 21 wherein the impregnation is carried out at a temperature of from about 70 to 175° F. and under a vacuum of about 14 to about 20 inches of Hg as measured by a standard vacuum gauge.

23. The process of claim 22 wherein the fat is saturated coconut oil with a melting point range of 105 to 110° F.

References Cited

UNITED STATES PATENTS 3,431,112   3/1969   Durst _____ 99—83 XR

LIONEL M. SHAPIRO, Primary Examiner

J. R. HOFFMAN, Assistant Examiner

U.S. Cl. X.R.

99—82, 83